Aug. 16, 1949.    J. F. BYRNE ET AL    2,479,208
PANORAMIC RECEIVER WITH QUARTER-WAVE
LINE DISCRIMINATOR SWEEP CIRCUIT
Filed March 1, 1946

INVENTORS.
JOHN F. BYRNE
FRED J. KAMPHOEFNER

BY

William D. Hall.

ATTORNEY

Patented Aug. 16, 1949

2,479,208

UNITED STATES PATENT OFFICE 2,479,208

PANORAMIC RECEIVER WITH QUARTER-WAVE LINE DISCRIMINATOR SWEEP CIRCUIT

John F. Byrne, Wellesley Hills, Mass., and Fred J. Kamphoefner, San Francisco, Calif., assignors to the United States of America as represented by the Secretary of War Application March 1, 1946, Serial No. 651,314

1 Claim. (Cl. 250—20)

This invention relates generally to electrical circuits and more particularly to sweep circuits for oscilloscopes and the like.

In one type of frequency spectrum analyzer the local oscillator of a superheterodyne radio receiver is frequency modulated so that incoming signals in a predetermined band of frequencies are passed in sequence through the intermediate frequency stages of the receiver. Generally an indicator such as an oscilloscope is associated with the receiver to afford a panoramic display of the received signals. For this purpose it is required that the sweep voltage which is applied to the indicator be synchronized with the sweep of the local oscillator.

An object of this invention is to provide a means for synchronizing the indicator sweep with the sweep of the local oscillator. Specifically, it is an object to provide a horizontal sweep voltage which is at all times proportional to the local oscillator frequency. A further object is to enable the oscillator to be swept in any arbitrary manner while automatically synchronizing the sweep voltage with it.

Other objects, features and advantages of this invention will suggest themselves to those skilled in the art and will become apparent from the following description of the invention taken in connection with the accompanying drawing in which.

Figure 1:
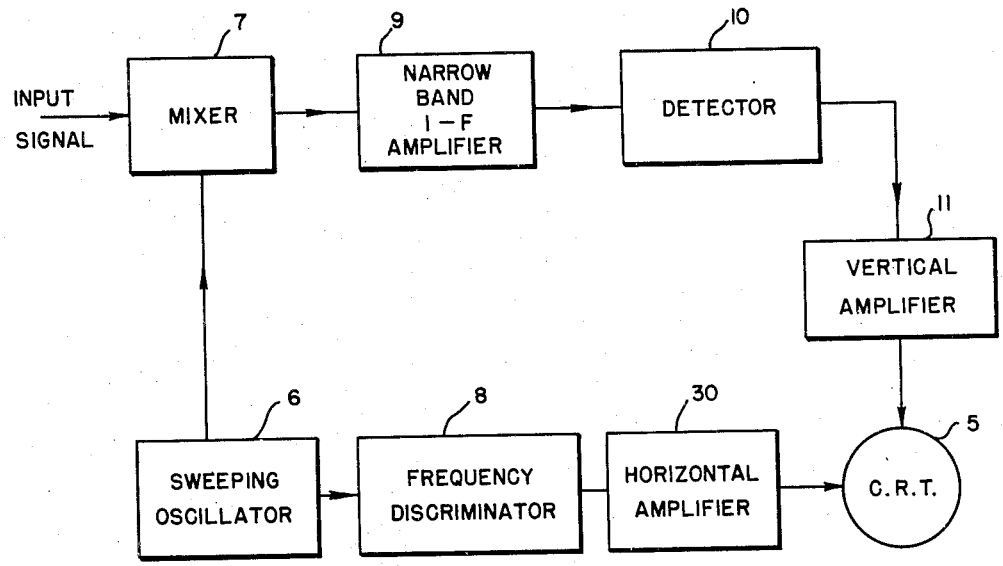
Fig. 1 is a block diagram of a system embodying the invention.

Referring to Fig. 1, the present invention is adapted to be utilized in a superheterodyne receiver having associated therewith a cathode ray tube 5 on which there is presented a panoramic display of the receiver signals. The local oscillator 6 of the receiver is continuously swept by a suitable frequency modulating means. The output of the oscillator 6 is fed to the mixer 7 of the receiver and also to a frequency discriminator 8, shown in detail in Fig. 2 and which will be described more fully hereinafter. The mixer 7 converts the incoming radio siknal to an intermediate frequency signal which is passed to the narrow-band intermediate frequency amplifier 9. The intermediate frequency signal is then detected by a detector 10, and the detected signal, being amplified by the vertical amplifier 11, is applied to the vertical deflectors of the cathode ray tube 5. Where the input signal contains components of various frequencies, as is the usual case, a succession of signal "pips" is produced on the indicator 5 by the sweeping action of the oscillator 6, the respective heights of these signal pips indicating the relative magnitudes of the signal components. It is desired to provide a panoramic presentation of the signals or signal components on the indicator 5 to enable the signal frequency spectrum to be analyzed.

Figure 2:
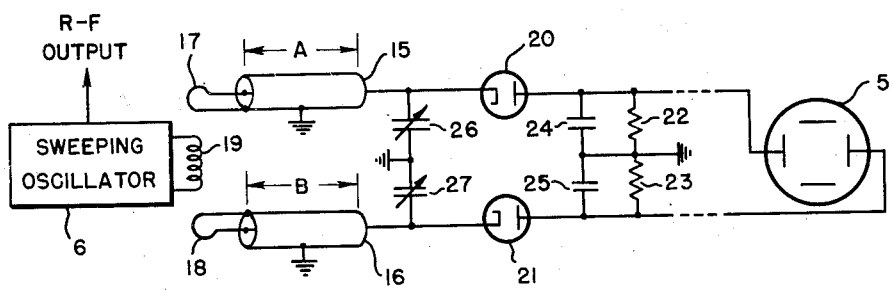
Fig. 2 is a schematic diagram of a portion of the system shown in Fig. 1.

In order to obtain an accurate panoramic presentation the sweep voltage applied to the horizontal deflectors of the cathode ray tube 5 should be exactly synchronized with the local oscillator sweep; that is to say, the sweep voltage should vary in proportion to the loval oscillator frequency. The present invention achieves this through the medium of the frequency discriminator 8, details of which are shown in Fig. 2. As there shown, the discriminator includes two coaxial transmission lines 15 and 16, respectively. The coupling loops 17 and 18 receive energy from the local oscillator tank coil 19 and feed such energy to the transmission lines 15 and 16. The length A of line 15 is one-quarter wavelength at a frequency just below the lowest frequency in the contemplated sweep range of the oscillator 6. The length B of the line 69 is one-quarter wavelength just above the highest frequency in the sweep range of the oscillator 6. The respective outputs of the transmission lines 15 and 16 are rectified by diodes 20 and 21 (which may be sections of a double diode) and delivered to a load network. This network comprises resistors 22 and 23 which are connected in series between the plates of the diodes 20 and 21. The junction of the resistors 22 and 23 is grounded, as are also the outer conductors of the transmission lines 15 and 16. Capacitors 24 and 25 are respectively shunted across resistors 22 and 23. Variable capacitors 26 and 27 are connected in series between the cathodes of the diodes 20 and 21, the junction of the capacitors 26 and 27 being grounded.

At the desired center frequency of the sweep band the coupling loops 17 and 18 pick up equal amounts of energy and the diodes 20 and 21 produce equal direct voltages, causing the output of the discriminator 8 to be zero. At the lowest frequency to be utilized, the low frequency quarter wave line 15 is resonant and therefore has its highest voltage output. At this frequency the other line 16 is farthest from its resonant frequency and therefore has the lowest voltage output. Under these conditions the diode 20 produces its maximum voltage and the diode 21 its minimum voltage. At the upper end of the frequency band, the conditions are reversed and the transmission line 16 is resonant while the line 15 is non-resonant. The output of frequency discriminator 8 is amplified by horizontal amplifier 30 and applied to the horizontal deflectors of the cathode ray tube 5. Depending upon whether the frequency of the local oscillator 6 is above or below the desired center frequency at a particular instance, the electron beam of the cathode ray tube 5 will be to one side or the other of the center of the screen. Proper balance adjustment may be obtained by means of the capacitors 26 and 27. As the frequency of the local oscillator 6 sweeps between its upper and lower limits, the electron beam of the cathode ray tube 5 is swept horizontally back and forth in synchronism therewith. This insures accurate panoramic presentation of the signal spectrum.

It will be appreciated that the use of the frequency discriminator 8 enables more exact synchronization to be realized than was possible heretofore in previous devices where the sweep voltage was generated externally and used to control the oscillator frequency through some means such as a reactance tube. The discriminator 8 also has the advantage of not employing any moving parts such as proposed in still other prior arrangements. The invention is likewise advantageous where it is desired to vary the local oscillator frequency in a random manner while causing the sweep of the oscilloscope to automatically follow the frequency variations.

While there has been described what is at present considered to be the preferred embodiment of this invention, it will be obvious to those skilled in the art that various changes and modifications may be made therein without departing from the scope of the invention.

What is claimed is:

In a panoramic superheterodyne radio receiver having associated with the output thereof a cathode ray tube indicator for presenting a panoramic display of signals received within a predetermined frequency band, a frequency-modulated local oscillator, a balanced frequency discriminator coupled to the output of said local oscillator for producing a voltage proportional to the frequency of said oscillator, said discriminator including two quarter-wave resonant lines, respectively tuned above and below the frequency modulation range of said oscillator, and rectifying means having a load circuit which is balanced with respect to ground, and a circuit balanced with respect to ground for applying the balanced voltage across said load circuit to the beam deflecting means of said indicator.

JOHN F. BYRNE.
FRED J. KAMPHOEFNER.

REFERENCES CITED

The following references are of record in the file of this patent:

UNITED STATES PATENTS

| Number | Name | Date |
| --- | --- | --- |
| 2,203,750 | Sherman | June 11, 1940 |
| 2,387,685 | Sanders | Oct. 23, 1945 |
| 2,410,122 | Mercer et al. | Oct. 29, 1946 |
| 2,413,939 | Benware | Jan. 7, 1947 |
| 2,420,892 | McClellan | May 20, 1947 |

FOREIGN PATENTS

| Number | Country | Date |
| --- | --- | --- |
| 113,637 | Australia | Aug. 21, 1941 |